US009102524B2

(12) United States Patent
Papadakis (10) Patent No.: US 9,102,524 B2
(45) Date of Patent: Aug. 11, 2015

(54) HIGH GAIN PHOTO AND ELECTRON MULTIPLIERS AND METHODS OF MANUFACTURE THEREOF

(75) Inventor: Stergios J. Papadakis, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 246 days.

(21) Appl. No.: 13/590,632

(22) Filed: Aug. 21, 2012

(65) Prior Publication Data

US 2013/0048830 A1    Feb. 28, 2013

Related U.S. Application Data

(60) Provisional application No. 61/525,884, filed on Aug. 22, 2011.

(51) Int. Cl.
| | |
|---|---|
| *H01J 40/14* | (2006.01) |
| *B82Y 20/00* | (2011.01) |
| *B82Y 15/00* | (2011.01) |
| *H01J 40/02* | (2006.01) |
| *H01J 43/20* | (2006.01) |

(52) U.S. Cl.
CPC ............ *B82Y 20/00* (2013.01); *B82Y 15/00* (2013.01); *H01J 40/02* (2013.01); *H01J 43/20* (2013.01)

(58) Field of Classification Search
CPC .......... H01J 43/00; H01J 43/04; H01J 43/246
USPC ........................................................ 250/207
See application file for complete search history.

(56) References Cited

U.S. PATENT DOCUMENTS

| 4,070,578 A * | 1/1978 | Timothy et al. ............ 250/336.1 |
| 7,294,417 B2 | 11/2007 | Ren et al. |
| 7,545,051 B2 | 6/2009 | Yang et al. |
| 7,612,342 B1 | 11/2009 | Nagarkar |
| 7,745,984 B2 | 6/2010 | Lee et al. |
| 7,768,181 B2 | 8/2010 | Baik et al. |
| 7,776,384 B2 | 8/2010 | Larouche et al. |
| 7,821,192 B2 | 10/2010 | Feng et al. |
| 2009/0321633 A1 * | 12/2009 | Blick et al. .................... 250/307 |
| 2010/0039014 A1 | 2/2010 | Kim et al. |
| 2010/0132771 A1 | 6/2010 | Lu |
| 2010/0144904 A1 | 6/2010 | Wang et al. |
| 2010/0295019 A1 | 11/2010 | Wang et al. |

FOREIGN PATENT DOCUMENTS

| EP | 1122759 | 8/2001 |
| WO | 2010138506 | 12/2010 |

OTHER PUBLICATIONS

Sainiemi, "Rapid fabrication of high aspect ratio silicon nanopillars for chemical analysis," Nov. 20, 2007, IOP Publishing Ltd Nanotechnology 18 (2007) 505303.*

* cited by examiner

*Primary Examiner* — Renee D Chavez
(74) *Attorney, Agent, or Firm* — Noah J. Hayward (57) ABSTRACT

A photomultiplier tube includes a photocathode, a first electrode, and a second electrode opposedly disposed to the first electrode and separated from it to create a space therebetween. An anode opposedly disposed to the photocathode. The first electrode and the second electrode are disposed between the anode and the photocathode. The photocathode is adjacent to the first electrode and separated from it, and the anode is adjacent to the second electrode and separated from it. An amplifying medium is disposed in the space between the first electrode and the second electrode. The amplifying medium includes metal oxide nanoparticles and/or an aerogel. The metal oxide nanoparticles have an aspect ratio greater than or equal to about 5.

17 Claims, 5 Drawing Sheets

HIGH GAIN PHOTO AND ELECTRON MULTIPLIERS AND METHODS OF MANUFACTURE THEREOF

CROSS-REFERENCE TO RELATED APPLICATIONS

This application claims priority to and the benefit of prior-filed U.S. Provisional Application No. 61/525,884, filed Aug. 22, 2011, the content of which is herein incorporated by reference in its entirety.

BACKGROUND

This disclosure generally relates to high gain photo and electron multiplier devices and to methods of manufacture thereof. More particularly, this disclosure relates to high-gain position-sensitive photomultiplier devices that are smaller, more robust, and less expensive than other commercially available photomultipliers.

Photomultiplier tubes and microchannel plates are often used for detection of light. Photomultiplier tubes (photomultipliers or PMTs for short), members of a class of vacuum tubes, and more specifically vacuum phototubes, are extremely sensitive detectors of light in the ultraviolet, visible, and near-infrared ranges of the electromagnetic spectrum. These detectors multiply the current produced by incident light by as much as several million times, in multiple dynode stages, enabling (for example) individual photons to be detected when the incident flux of light is very low.

The combination of high gain, low noise, high frequency response or, equivalently, ultra-fast response, and large area of collection has earned photomultiplier tubes an essential place in nuclear and particle physics, astronomy, medical diagnostics including blood tests, medical imaging, motion picture film scanning (telecine), radar jamming, and high-end image scanners known as drum scanners. Elements of photomultiplier technology, when integrated differently, are the basis of night vision devices.

Currently, photomultiplier tubes are the most common choice for scintillator photon detection because of cost and gain linearity. Unfortunately, they are bulky, heavy, and fragile.

Micro-channel plate (MCP) detectors are a planar component used for detection of particles (electrons or ions) and impinging radiation (ultraviolet radiation and X-rays). They are closely related to photomultiplier tubes, as both intensify single particles or photons by the multiplication of electrons via secondary electron emission. However, because a microchannel plate detector has many separate channels, it can additionally provide spatial resolution.

A micro-channel plate is a slab made from highly resistive material of typically 2 millimeter thickness with a regular array of tiny tubes or slots (microchannels) leading from one face to the opposite, densely distributed over the whole surface. The microchannels are approximately 10 micrometers in diameter (6 micrometer in high resolution MCPs) and spaced apart by approximately 15 micrometers; they are parallel to each other and often enter the plate at a small angle to the surface (about 8° from normal).

Photomultiplier tubes are more common than microchannel plates in scintillator-based detection systems because they are significantly less expensive and have a larger dynamic range where the gain is linear. Microchannel plates offer modest amplification and size advantages, but are significantly more expensive and are at least as fragile as photomultiplier tubes. Fabrication of microchannel plates requires sophisticated glass fiber-bundle drawing techniques and results in both high cost per unit and very fragile final structures. Due to the fragility of the microchannel plates itself, packaged devices are also bulky because of the more severe constraints placed on the packaging to protect the microchannel plates.

Since microchannel plates are expensive and bulky and since photomultiplier tubes are heavy, bulky and fragile, it is desirable to find replacements that are inexpensive, light, flexible and can detect single photons.

BRIEF SUMMARY

A photomultiplier tube according to one or more example embodiments includes a photocathode, a first electrode, and a second electrode, where the second electrode is opposedly disposed to the first electrode and separated from it to create a space therebetween. The photomultiplier tube also includes an anode opposedly disposed to the photocathode, where the first electrode and the second electrode are disposed between the anode and the photocathode, the photocathode is adjacent to the first electrode and separated from it, and the anode is adjacent to the second electrode and separated from it. An amplifying medium is disposed in the space between the first electrode and the second electrode. There the amplifying medium includes metal oxide nanoparticles and/or an aerogel, and the metal oxide nanoparticles have an aspect ratio greater than or equal to about 5.

Disclosed herein too is a method of manufacturing a photomultiplier tube, which includes disposing a first electrode and a second electrode between a photocathode and an anode, the photocathode being adjacent to the first electrode and is separated from it and where the anode is adjacent to the second electrode and is separated from it. The first electrode is opposedly disposed to the second electrode, and the first electrode is disposed between the photocathode and the second electrode, while the second electrode is disposed between the first electrode and the anode. The method further includes disposing a mat including metal oxide nanoparticles and/or an aerogel into a space formed between the first electrode and the second electrode, where the metal oxide nanoparticles have an aspect ratio of greater than or equal to about 5.

Disclosed herein too is a method of using a photomultiplier tube including disposing the photomultiplier tube in the path of an incident stream of photons, where the photomultiplier tube includes a photocathode, a first electrode, and a second electrode. The second electrode is opposedly disposed to the first electrode and separated from it to create a space therebetween, and an anode is opposedly disposed to the photocathode. The first electrode and the second electrode are disposed between the anode and the photocathode, the photocathode being adjacent to the first electrode and separated from it, and the anode being adjacent to the second electrode and separated from it. An amplifying medium is disposed in the space between the first electrode and the second electrode, the amplifying medium including metal oxide nanoparticles and/or an aerogel, where the metal oxide nanoparticles have an aspect ratio greater than or equal to about 5. The method further includes measuring the intensity of the incident stream of photons.

BRIEF DESCRIPTION OF THE DRAWINGS

The above and other features, aspects, and advantages will become more readily apparent from the detailed description, accompanied by the drawings, in which.

DETAILED DESCRIPTION

Disclosed herein is photomultiplier tube, which includes an amplification medium having a mat of materials with nanoscale dimensions, examples of which include metal oxide single crystal nanoparticles (hereinafter "metal oxide nanoparticles"), nanoribbons or nanowires, aerogels and/or a combination thereof. The nanoparticles typically have an aspect ratio greater than or equal to about 5. The photomultiplier tube is much smaller and more mechanically robust than other commercially available photomultiplier tubes (hereinafter "comparative photomultiplier tubes") or microchannel plates, and is substantially less expensive. The use of a mat of metal oxide nanoparticles and/or the use of an aerogel as the amplification medium permits the use of photomultiplier tubes that have very large surface areas in enclosures of small volumes (e.g., enclosures having thicknesses of less than or equal to about 1 millimeter) and therefore permits, e.g., a much larger fraction of a scintillator to be covered with the photomultiplier tube, thereby minimizing the loss of photons. The amplification medium outperforms other conventional amplification mediums in cost, mechanical robustness, size, flexibility, and gain linearity.

Disclosed herein too is a method of manufacturing the photomultiplier tube that includes disposing a first electrode and a second electrode between a photocathode and an anode. The first electrode is opposedly disposed to the second electrode and the photocathode and the anode are also opposedly disposed to each other. The first electrode is disposed between the photocathode and the second electrode, while the second electrode is disposed between the first electrode and the anode. The method further comprises disposing a mat comprising metal oxide nanoparticles and/or an aerogels into a cavity formed between the first electrode and the second electrode to form the photomultiplier tube. The metal oxide nanoparticles have an aspect ratio of greater than or equal to about 5.

Figure 1:
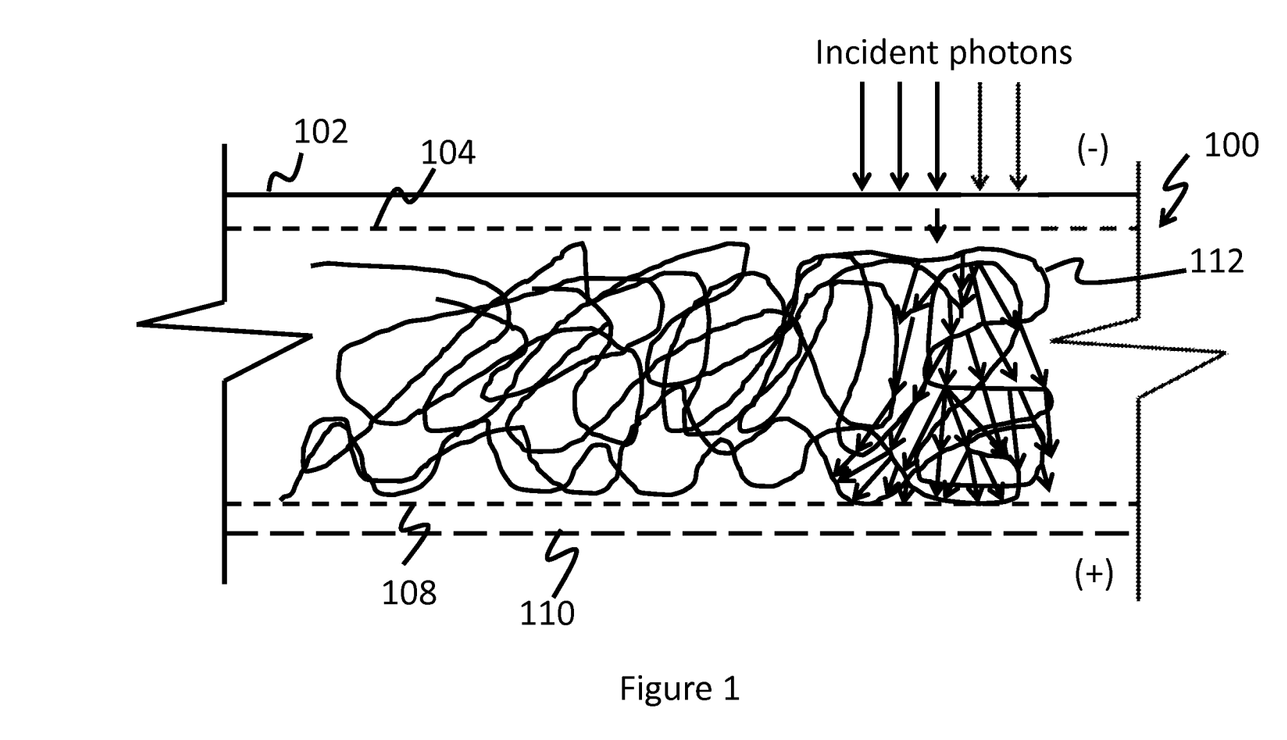
FIG. 1 is a schematic depiction of an exemplary photomultiplier tube.

With reference now to FIG. 1, the photomultiplier tube 100 comprises a photocathode 102, a first electrode 104 (also called an upper electrode 104), a second electrode 108 (also called a lower electrode 108), and an anode 110. The photocathode 102 is opposedly disposed to the anode 110. Disposed between the photocathode 102 and the anode 110 is the first electrode 104 and the second electrode 108. The first electrode 104 and the second electrode 108 are generally manufactured from metal grids. Disposed between the first electrode 104 and the second electrode 108 is the amplification medium 112. The anode 110 may be a segmented anode or a resistive anode and can function as a position sensitive detector. Position sensitive detectors measure the position of an electron generated in the photomultiplier tube 100 and relate the position of the electron to a position in the source at which a photon was generated. The position sensitive detector can measure the position of an electron in one or two-dimensions on a sensor surface.

The photocathode 102 is a negatively charged electrode that is coated with a photosensitive compound (not shown). When the photocathode 102 is struck by a quantum of light (i.e., a photon), the absorbed energy causes electron emission due to the photoelectric effect. A photocathode usually comprises alkali metals with very low work functions that are coated with the photosensitive compound. The coating releases electrons much more readily than the underlying metal, allowing it to detect even the low-energy photons in the infrared radiation range. Other higher energy forms of radiation such as visible radiation, UV radiation, xray radiation, and the like, can also impinge on the photocathode 102 and result in electron emission.

The photosensitive compound coating may comprise GaAs (gallium(II) arsenide, InGaAs (indium gallium arsenide), Cs—Te (cesium-telluride), Cs—I (cesium-iodide), a bialkali metal such as antimony-rubidium-caesium (Sb—Rb—Cs), antimony-potassium-caesium (Sb—K—Cs), sodium-potassium-antimony (Na—K—Sb), or a multi-alkali metal such as sodium-potassium-antimony-caesium (Na—K—Sb—Cs).

The first electrode 104 and the second electrode 108 are grid electrodes (also called mesh electrodes). The first electrode 104 is disposed between the photocathode 102 and the second electrode 108, while the second electrode 108 is disposed between the first electrode 104 and the anode 110. Both the first electrode 104 and the second electrode 108 are disposed between the photocathode 102 and the anode 110. In one embodiment, the first electrode 104 and the second electrode 108 are metallic mesh electrodes. Examples of metals used in the mesh electrodes are titanium, niobium, tantalum, iron, iron alloys, stainless steel, copper nickel, nickel alloys, or the like, or a combination comprising at least one of the foregoing metals. Electrically conductive ceramic wires such as those manufactured from indium tin oxide, indium zinc oxide, tin oxide, or the like, and electrically insulating wires coated with a conducting polymers such as polypyrroles, polyanilines, polythiophenes, or the like, may also be used for the first electrode 104 and the second electrode 108.

As noted above, the anode 110 may be a solid metal or a segmented metal anode. In one embodiment, if position sensitivity is desired the anode may be segmented or may be a resistive anode. Different films provide different spatial resolutions and therefore a film should be chosen depending upon the desired spatial resolutions. The resistive anode is formed of a material having high surface resistance, such as a reinforced polyester film (e.g., MYLAR® film) or a polyimide film (e.g., KAPTON® film).

It is to be noted that by choosing materials for the photocathodes, anodes, and electrodes that are flexible, the disclosed photomultiplier tube can be made to be flexible-on-demand. The term "flexible" as used implies changing the curvature of the photomultiplier tube when desired. For example, it can be re-shaped when desired to fit a particular application. The photomultiplier tube can also be manufactured in a modular fashion, i.e., it can also be easily resized if desired by adding on the relevant portions of the photocathodes, anodes, and electrodes to fit a desired application. In short, the photomultiplier tube can be resized for use in different housings in different machines or devices.

The term "flexible" is also used to imply that the electrical characteristics of the photomultiplier tube can be changed by changing the volume of the amplification medium used in the photomultiplier tube. The gain of the photomultiplier tube can thus be changed depending upon the flux of incident radiation. Since the amplification medium is in the form of a nanoparticle mat, additional quantities of the amplification medium can be added to the photomultiplier tube. In a similar manner, quantities of the amplification medium can also be removed from the photomultiplier tube. Some of these features will be discussed in detail below.

With reference now again to FIG. 1, the amplification medium 112 comprises a mat of metal oxide nanoparticles and/or an aerogel. The nanoparticles have a high aspect ratio. The aspect ratio is greater than 5, specifically greater than 50, and more specifically greater than 100. The aspect ratio is defined as the length of the nanoparticle divided by the narrowest cross-sectional distance. The length of the nanoparticle is the largest dimension of the nanoparticle and is taken as the distance between a first end and a second end (the second end being opposed to the first end) of the nanoparticle when the nanoparticle is completely stretched out. The narrowest cross-sectional distance is measured along the cross-sectional area of the nanoparticle and is generally measured along a direction that is perpendicular to the direction along which the length of the nanoparticle is measured. For example, a nanoribbon having a thickness of 5 to 50 nanometers, a width of 50 to 500 nanometers and a length of 10,000 nanometers has an aspect ratio of 10,000 (the largest dimension) divided by 5 (the smallest dimension), which is equal to 2,000.

The nanoparticles can include nanorods, nanotubes, nanowhiskers, nanoribbons, nanosheets, or the like, or a combination thereof. In one embodiment, the nanorods, nanotubes, nanowhiskers, nanoribbons, and nanosheets can have branches if desired. In another embodiment, the nanotubes, nanotubes, nanowhiskers, nanoribbons, and nanosheets can be connected to one another by covalent bonds or by ionic bonds (i.e., a branch can connect a first nanotube with a second nanotube or with another first nanorod, first nanoribbon, or the like). The nanoparticles are generally in the form of agglomerates. When branched nanoparticles are used as the amplification medium, the aspect ratio is calculated as being the largest dimension of the particular nanoparticle divided by the smallest dimension of a particular stem or branch of the nanoparticle.

The metal oxide can comprise zinc oxide (ZnO) nanoribbons, tin dioxide ($SnO_2$) nanoribbons, indium (III) oxide ($In_2O_3$) nanowires, cadmium oxide (CdO) nanoribbons, gallium (III) oxide ($Ga_2O_3$) nanoribbons, tungsten oxide ($WO^3$) nanowires, titanium dioxide ($TiO^2$) nanotubes, or the like, or a combination thereof. While the foregoing metal oxide nanoparticles are listed in one form, other commercially available forms having the same chemical composition can be used so long as they meet the aspect ratio limitations of being greater than or equal to about 5. For example, while the zinc oxide above is listed as being in the form of nanoribbons, it can also be used in the form of nanotubes, nanowires, nanorods or nanosheets, if such shapes are commercially available.

The nanoparticles form agglomerates (termed a mat) because of intermolecular forces and because of entanglements. It is desirable for the agglomerates used as the amplification medium to be in the form of a dense mat. It is desirable for the nanoparticles used in the amplifying medium to be in the form of a low-density mat having an average inter-particle spacing of 0.25 to 100 micrometers (µm), specifically 1 to 75 µm, and more specifically 2 to 50 µm. The nanoparticle spacing is the spacing between different nanoparticles in an agglomerate. For example, if the nanoparticle is a nanoribbon, the average inter-ribbon spacing (which refers to the respective parts of a particular nanoribbon) is 0.5 to 100 micrometers (µm), specifically 1 to 75 µm, and more specifically 2 to 50 µm.

As noted above, aerogels may also be used as the amplifying medium. In one embodiment, graphene oxide aerogels which comprise carbon atoms that are arranged into a sheet-like nanostructure. The manufacturing and properties of graphene oxide aerogels is disclosed in U.S. Patent Publication No. 20100144904 to Wang, et al., the entire contents of which are hereby incorporated by reference. Other aerogels include metal oxide aerogels such as silica aerogels, alumina aerogels, titania aerogels, zirconia aerogels, or the like, or a combination comprising at least one of the foregoing aerogels; chalcogels (aerogels manufactured from chalcogens), organic aerogels such as resorcinol formaldehyde aerogels, melamine formaldehyde aerogels, or the like, or a combination comprising at least one of the foregoing organic aerogels.

The use of nanoparticles having aspect ratios greater than 5 and/or aerogels as the amplifying medium provides the photomultiplier tube with many advantages over microchannel plate detectors and conventional photomultiplier tubes. These advantages include cost and geometric flexibility and some of these are detailed below.

Figure 2:
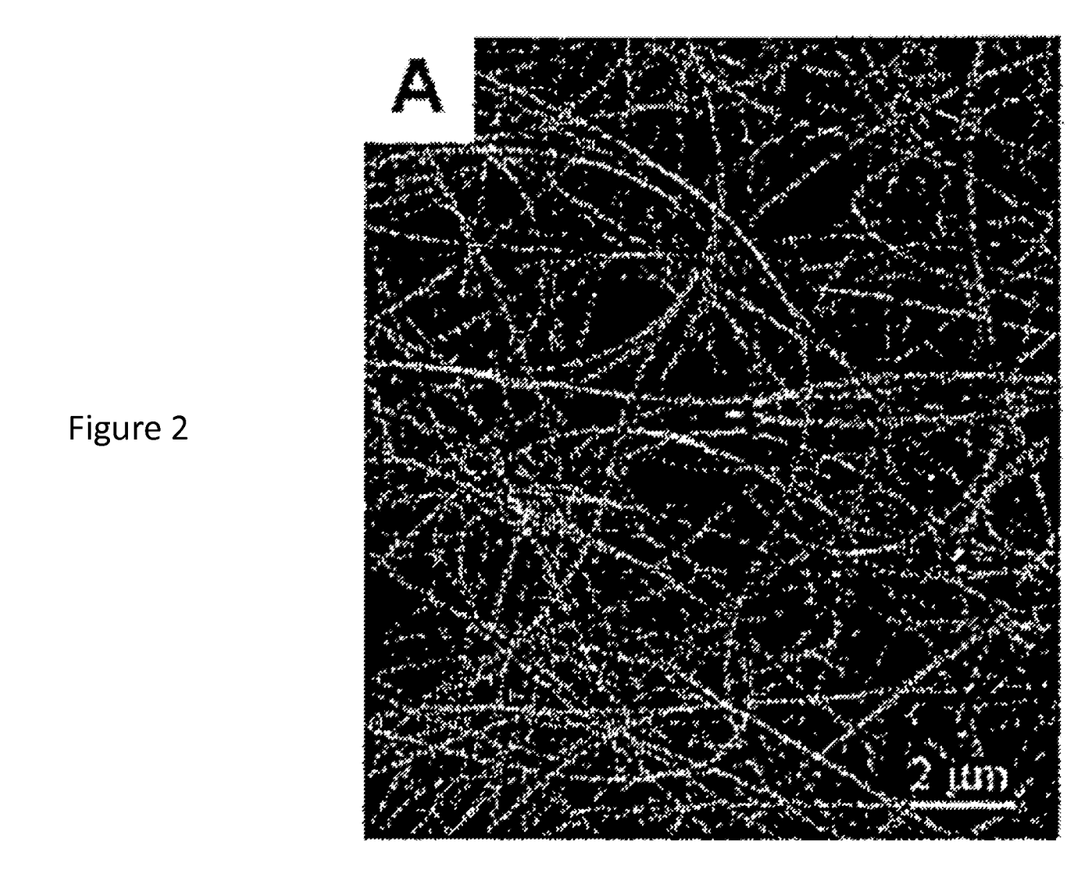
FIG. 2 is a photomicrograph of a mat of zinc oxide nanoribbons.

Exemplary nanoparticles for use as the amplification medium in the photomultiplier tube are zinc oxide nanoribbons and/or the graphene oxide aerogels. The zinc oxide nanoribbons are single crystal nanoribbons that have a thickness of 5 to 50 nanometers (nm), a width of 50 to 500 nm and a length of hundreds of micrometers. Zinc oxide nanoribbons are grown simply by evaporating zinc oxide powder in a flowing inert gas environment, and collecting the ribbons downstream. FIG. 2 is a photomicrograph that shows such an as-collected mat. The zinc oxide mat is far more robust than a microchannel plate because it comprises very high aspect ratio ribbons, which are each very flexible. The photomultiplier tube can thus be easily bent, shaken, or compressed without damage. The microchannel plate in contrast comprises channels disposed in a bulky glass substrate and hence it is heavy and inflexible.

In addition, since the growth technique for the metal oxide nanoparticles and/or the graphene oxide aerogels is scalable very large quantities can be grown rapidly at low cost. The cost of a photomultiplier tube containing the metal oxide nanoparticle amplifying medium is substantially less than a comparative photomultiplier tube having a microchannel plate, because the cost of producing the nanoparticle mat is very low, when compared with the production of the multichannel plate. The packaging for the photomultiplier tube containing the nanoparticle amplification medium would also be thinner and less expensive than for a microchannel plate, as rigid mechanical support to protect the amplification medium is not generally desirable.

The ease of handling of the metal oxide nanoparticle mat and/or the graphene oxide aerogel offers other advantages over the existing detectors. Photomultiplier tubes that use the metal oxide nanoparticle mat and/or the graphene oxide aerogel can be made with much larger areas than conventional photomultiplier tubes or microchannel plate. Since the metal oxide nanoparticle mats and/or the graphene oxide aerogels are not monolithic, they can easily be added to or reduced. In other words, the size of the mat or the aerogel can be increased by adding additional metal oxide nanoparticles or decreased without any damage to the performance of the photomultiplier tube.

Figure 3:
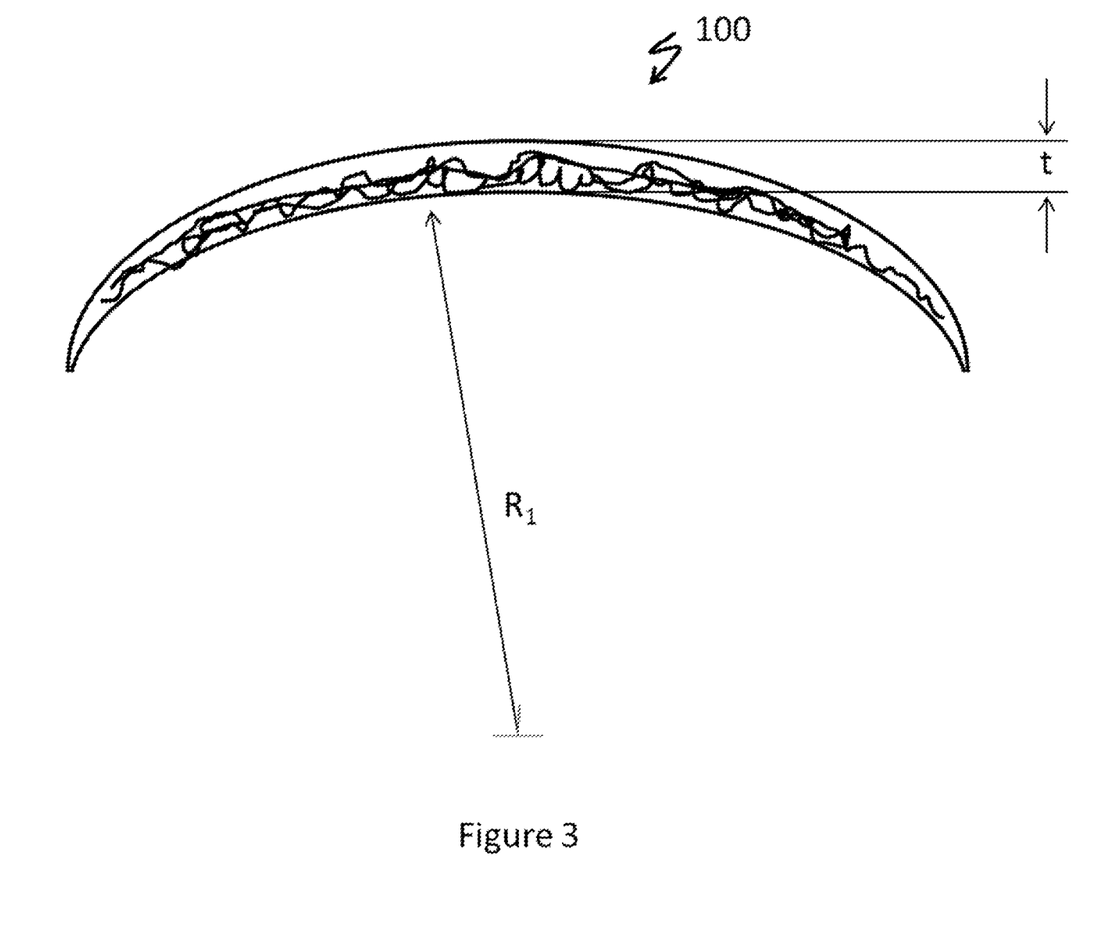
FIG. 3 is a schematic depiction of an exemplary curved photomultiplier tube.

The flexibility of the mat or the aerogel allows curved detectors to be easily fabricated. As long as the radius of curvature of the detector is large relative to the thickness of the mat, curvature will have no effect. The FIG. 3 depicts one exemplary schematic cross-section of a curved photomultiplier tube 100. This depiction does not show the first and second electrodes, but is mean to demonstrate the curvature of the photomultiplier tube 100. In one embodiment, the ratio of the radius of curvature R1 of the photomultiplier tube to the thickness "t" of the photomultiplier tube 100 (as depicted in FIG. 3) is 5:1 to 1000:1, specifically 30:1 to 500:1, and more specifically 50:1 to 100:1.

Since the mat and the aerogel are flexible, the thickness "t" of the photomultiplier tube can be very narrow or alternatively it can be as thick as is desired. It can therefore vary from 0.5 millimeters to 60 millimeters depending upon the utility of a particular application. In an exemplary embodiment, the thickness "t" of the photomultiplier tube can be 1 to 5 millimeters. The radii "R1" can also be of a few millimeters to tens of millimeters. In addition to curved photomultiplier tubes, tubes of irregular geometrical shapes can also be manufactured.

These geometric advantages afforded by the metal oxide nanoparticles and/or the graphene oxide aerogels allow for the manufacturing of inexpensive, high-gain photomultiplier tubes. For example, in a typical scintillator application where a conventional photomultiplier tube has dimensions of 4 inches×4 inches×16 inches, both ends and three of the sides of the scintillator may be completely covered with metal oxide nanoparticles and/or graphene oxide aerogels, shaped to completely cover their respective faces. Since the amplification medium is much thinner than other conventional amplification mediums, total detector size can be significantly reduced.

The use of metal oxide nanoribbons and/or the graphene oxide aerogels as the amplification medium can increase the gain of a photomultiplier tube by an amount of 10% to over 100% over a conventional photomultiplier tube for a given weight of the photomultiplier tube. Due to the very small mass of the metal oxide nanoribbons and/or the graphene oxide aerogels, direct photomultiplier tube interactions with incoming gamma photons will be negligible compared to the interactions between conventional photomultiplier tubes with the gamma photons.

The photomultiplier tube design of FIGS. 1 and 3 also permits the determination of the position of an incoming photon, i.e., position sensitivity can be designed into the photomultiplier tube. If the anode is segmented, the position of the incident photon can be deduced from the distribution of captured current over the anode segments. The use of a resistive anode would yield higher spatial resolution than the use of a segmented anode.

Position sensitivity means that photomultiplier tubes that use metal oxide nanoparticles and/or graphene oxide aerogels can be used in both of the spectroscopic gamma-camera approaches that are currently commercially available. These are the coded-aperture approach and the Compton telescope approach, both of which will not be described in detail here.

In the coded-aperture approach, a position sensitive photomultiplier tube (comprising a large-area metal oxide nanoribbon amplification medium and/or graphene oxide aerogels) could be placed behind a scintillator, which is placed some distance behind the coded aperture itself. In the Compton telescope approach, two scintillator layers, each with a single large-area position-sensitive photomultiplier (again comprising a large-area metal oxide nanoribbon amplification medium and/or graphene oxide aerogels) behind it, may be used. Currently, such devices are made using arrays of cadmium-zinc-telluride (CZT) detectors, which are very expensive, or with scintillators and an array of small photomultiplier tubes. Using the disclosed photomultiplier tube with a scintillator would be far less expensive and offer similar or improved performance when compared with conventional photomultiplier tubes.

In one embodiment, in one method of using the photomultiplier tube of FIG. 1, a primary incident photon and/or particle (e.g., electron, atom, neutron, ion, or the like, or a combination thereof) impinges on the amplifying medium. The primary incident photon or particle passes through grid electrode 104 and strikes the metal oxide nanoparticles and/or the graphene oxide aerogel generating secondary electrons. It is to be noted that the photons generally impinge on the photocathode 102 to generate electrons which then impinge upon the amplifying medium to generate secondary electrons. Other particles such as electrons, atoms, neutrons, ions, or the like, can impinge directly on the amplifying medium to generate secondary electrons without first impinging on the photocathode.

The secondary electrons strike other portions of the metal oxide nanoparticles and/or the graphene oxide aerogel located between the first and the second electrodes, thus generating additional secondary electrons. With each contact between a secondary electron and a portion of the metal oxide nanoparticles and/or the graphene oxide aerogel, additional electrons are generated thus producing a cascade of electrons that are accelerated towards the anode 110. In order to generate a large cascade of secondary electrons it is desirable to use metal oxide nanoparticles that are packed in the form of a low density mat. In one embodiment, the gain is greater than or equal to 10, specifically greater than or equal to 1,000, and more specifically greater than or equal to 1,000,000 in single stage. The amplifying medium may also be employed in multiple stages, so as to increase the gain even further.

In one embodiment, of manufacturing the photomultiplier tube 100 of FIG. 1, the photocathode 102 is disposed over the first electrode 104 and the second electrode 108. The anode 110 is disposed on a side of the second electrode 108 that is opposed to the side facing the first electrode 104. The photocathode 102 is disposed on a side of the first electrode 104 that is opposed to the side facing the anode 110. The photocathode 102 is separated from the first electrode 104, while the anode is separated from the second electrode 108. The first electrode 104 and the second electrode 108 thus lie between the photocathode 102 and the anode 110 and are separated from them. A vacuum lies between the photocathode 102 and the first electrode 104, between the first electrode 104 and the second electrode 108, and between the second electrode 108 and the anode 110. The amplifying medium 112 is disposed between the first electrode 104 and the second electrode 108.

Figure 4:
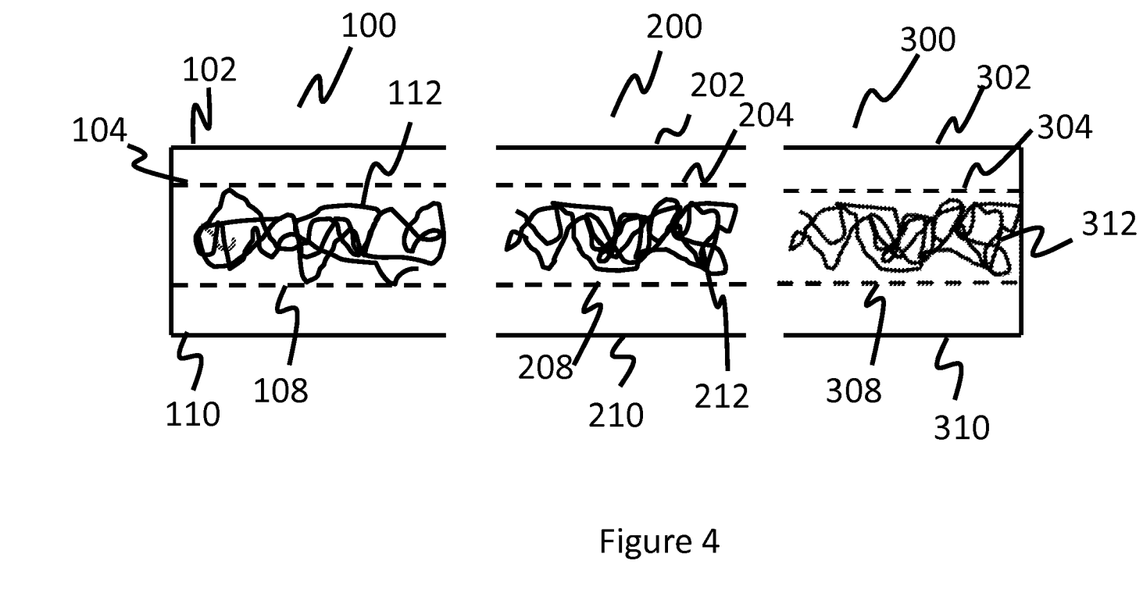
FIG. 4 is a schematic depiction of an exemplary modular device, where a plurality of modules form the photomultiplier tube.

In one embodiment, the photomultiplier tube 100 can comprise a plurality of modules which are added on or removed to increase or reduce the length of the photomultiplier tube 100 when desired. In this embodiment, which is depicted in FIG. 4, a first module 100 may be reversibly attached to a second module 200, which may be reversibly attached to a third module 300. Each module contains an amplification medium 112, 212, 312 respectively that is used to produce a cascade of secondary electrons. All of the modules depicted in FIG. 4 contain respective photocathodes 102, 202, 302 that are separated and disposed adjacent to first electrodes 104, 204, 304 respectively. The modules also contain anodes 110, 210 and 310 respectively that are separated and disposed adjacent to second electrodes 108, 208, 308 respectively. The set-up in FIG. 4 for each respective module 100, 200 or 300 is similar to that described in FIG. 1. The respective modules can be attached to one another or detached from one another depending upon the requirements of a particular application. The first module, the second module and the third module can be attached to each other using adhesive, magnets, fastenings (e.g., screw threads), dowel pins, and the like. The use of modular manufacturing for this particular form of photomultiplier is possible only because of the flexible nature of the amplification medium.

Figure 5:
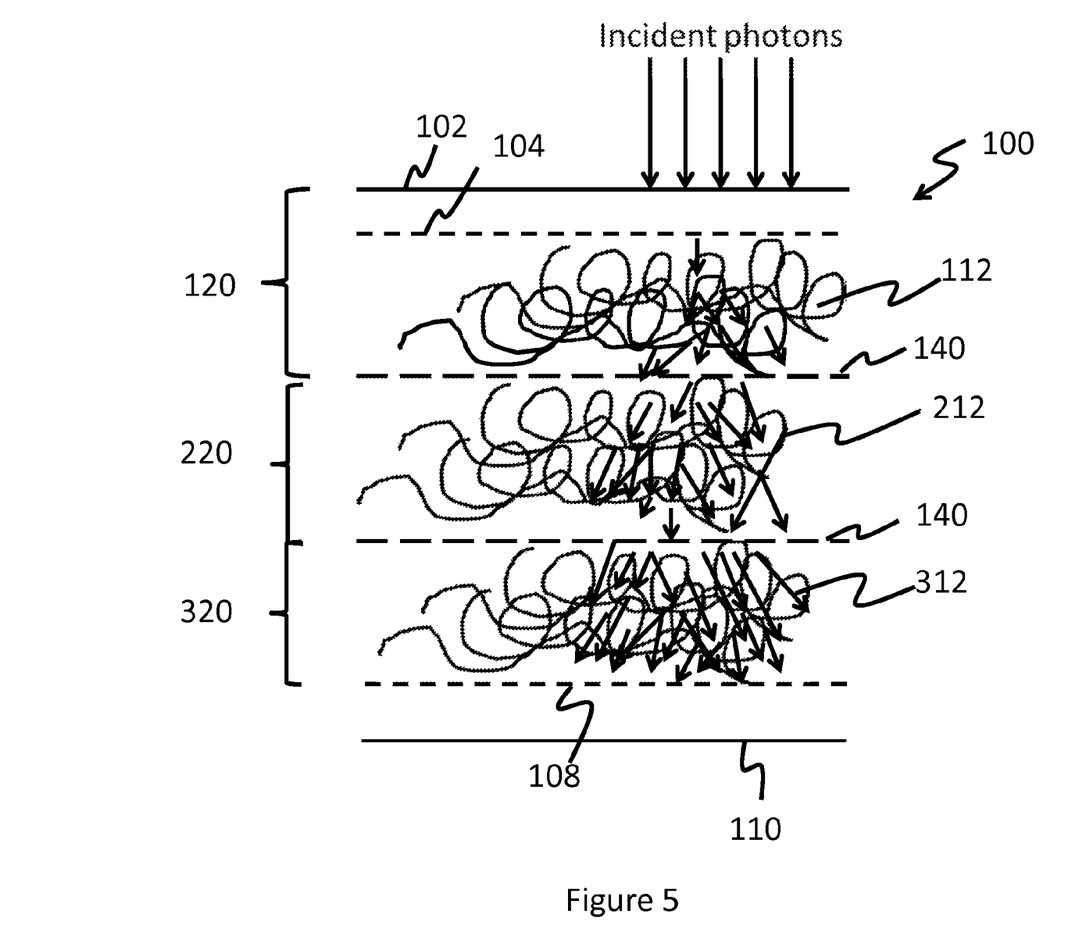
FIG. 5 is a schematic depiction of a photomultiplier tube that comprises a plurality of stages, where each stage comprises the amplification medium.

In yet another embodiment, the photomultiplier tube 100 can be manufactured in stages to increase the gain of the photomultiplier tube. In FIG. 5, the photomultiplier tube 100 comprises three stages 120, 220 and 320 arranged in series, where each stage comprises amplification medium 112, 212 and 312 respectively. Each stage is separated by a grid, through which electrons can pass. A primary incident photon impinging on the amplification medium 112 of the first stage produces secondary electrons, which then impinges on other parts of the amplification medium 112 releasing more electrons. The electrons from the first stage 120 then cascade onto the amplification medium 212 of the second stage 220, to produce an even larger cascade of electrons. The electrons from the second stage 220 impinge onto the amplification medium 312 of the third stage 320 where an even larger amount of electrons are produced, which then impinge onto the anode to provide information about the primary incident photon.

As noted above, the photomultiplier tube 100 disclosed herein has a number of advantages over conventional photomultiplier tubes because of the use of metal oxide nanoparticles and/or the graphene oxide aerogels as the amplification medium. The photomultiplier is lighter and less expensive than conventional photomultiplier tubes or microchannel plates. It is more flexible and can be designed to display a much higher gain than conventional photomultiplier tubes and microchannel plates.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, singular forms like "a," or "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element's as illustrated in the Figures. It will be understood that relative terms are intended to encompass different orientations of the device in addition to the orientation depicted in Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term and/or is used herein to mean both "and" as well as "or". For example, "A and/or B" is construed to mean A, B or A and B.

The transition term "comprising" is inclusive of the transition terms "consisting essentially of" and "consisting of" and can be interchanged for "comprising".

All ranges disclosed herein are combinable and are inclusive of end-points.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A photomultiplier tube comprising:
    a photocathode;
    a first electrode;
    a second electrode opposedly disposed to the first electrode and separated from the first electrode to create a space therebetween;
    an anode opposedly disposed to the photocathode, the first electrode and the second electrode being disposed between the anode and the photocathode, the photocathode being adjacent to the first electrode and separated from it, and the anode being adjacent to the second electrode and separated from it; and an amplifying medium disposed in the space between the first electrode and the second electrode, wherein the amplifying medium comprises both metal oxide nanoparticles and an aerogel, the metal oxide nanoparticles have an aspect ratio greater than or equal to 5 and are in the form of agglomerates, and the aerogel comprises one or more of a metal oxide aerogel, a graphene oxide aerogel, a chalcogel, an organic aerogel, and combinations thereof.

2. The photomultiplier tube of claim 1, wherein the metal oxide nanoparticles comprise one or more of zinc oxide nanoribbons, tin dioxide nanoribbons, indium (III) oxide nanowires, cadmium oxide nanoribbons, gallium (III) oxide nanoribbons, tungsten oxide nanowires, titanium dioxide nanotubes, and combinations thereof.

3. The photomultiplier tube of claim 2, wherein the metal oxide nanoparticles are single crystals.

4. The photomultiplier tube of claim 3, wherein the metal oxide nanoparticles have an aspect ratio greater than or equal to 100.

5. The photomultiplier tube of claim 3, wherein the metal oxide nanoparticles are branched.

6. The photomultiplier tube of claim 3, wherein the metal oxide nanoparticles are arranged in the form of a mat.

7. The photomultiplier tube of claim 3, wherein the metal oxide nanoparticles have an average interparticle spacing of 0.25 micrometers to 100 micrometers.

8. The photomultiplier tube of claim 1, wherein the metal oxide nanoparticles are single crystal zinc oxide nanoribbons.

9. The photomultiplier tube of claim 8, wherein the zinc oxide nanoribbons have a thickness of 5 nanometers to 50 nanometers, a width of 50 nanometers to 500 nanometers and an average aspect ratio of greater than 50.

10. The photomultiplier tube of claim 2, having a gain of greater than or equal to about 1,000,000.

11. The photomultiplier tube of claim 1, wherein
the aerogel is an organic aerogel, and
the organic aerogel comprises one of a resorcinol formaldehyde aerogel and a melamine formaldehyde aerogel.

12. The photomultiplier tube of claim 1, wherein the photomultiplier tube comprises a plurality of stages arranged in series, where each stage has a space that comprises an amplification medium; and where each successive stage is arranged to be adjacent to a preceding stage.

13. The photomultiplier tube of claim 1, wherein
the anode comprises one of a resistive anode and a segmented anode, and
the photomultiplier provides spatial information about a photon that is incident upon the photocathode.

14. A method of manufacturing a photomultiplier tube, the method comprising:
disposing a first electrode and a second electrode between a photocathode and an anode; the photocathode being disposed adjacent to the first electrode and separated from it, the anode being disposed adjacent to the second electrode and separated from it, the first electrode being oppositely disposed to the second electrode; the first electrode being disposed between the photocathode and the second electrode, and the second electrode being disposed between the first electrode and the anode; and
disposing a mat comprising both metal oxide nanoparticles and an aerogel into a space formed between the first electrode and the second electrode,
wherein the metal oxide nanoparticles have an aspect ratio of greater than or equal to 5 and are in the form of agglomerates,
and wherein the aerogel comprises one or more of a metal oxide aerogel, a graphene oxide aerogel, a chalcogel, an organic aerogel, and combinations thereof.

15. The method of claim 14, wherein
the aerogel is an organic aerogel, and
the organic aerogel comprises one of a resorcinol formaldehyde aerogel and a melamine formaldehyde aerogel.

16. A method of using a photomultiplier tube, the method comprising:
disposing the photomultiplier tube in the path of an incident stream of photons; and
measuring the intensity of the incident stream of photons, wherein the photomultiplier tube comprises:
a photocathode;
a first electrode;
a second electrode oppositely disposed to the first electrode and separated from the first electrode to create a space therebetween;
an anode oppositely disposed to the photocathode, the first electrode and the second electrode being disposed between the anode and the photocathode, the photocathode being adjacent to and separated from the first electrode, and the anode being adjacent to and separated from the second electrode; and
an amplifying medium disposed in the space between the first electrode and the second electrode, the amplifying medium comprising both metal oxide nanoparticles and an aerogel, wherein the metal oxide nanoparticles have an aspect ratio greater than or equal to about 5 and are in the form of agglomerates, and wherein the aerogel comprises one or more of a metal oxide aerogel, a graphene oxide aerogel, a chalcogel, an organic aerogel, and combinations thereof.

17. The method of claim 16, further comprising determining a spatial position of a photon in the incident stream of photons.

* * * * *